Sept. 27, 1955 W. R. BENNETT ET AL 2,719,189

PREVENTION OF INTERPULSE INTERFERENCE
IN PULSE MULTIPLEX TRANSMISSION

Filed May 1, 1951 3 Sheets-Sheet 1

INVENTORS: W. R. BENNETT
C. B. H. FELDMAN
BY Harry C. Hart
ATTORNEY

INVENTORS: W. R. BENNETT
C. B. H. FELDMAN
BY Harry C. Hart
ATTORNEY

INVENTORS: W. R. BENNETT
C. B. H. FELDMAN
BY Harry C. Hart
ATTORNEY 2,719,189

PREVENTION OF INTERPULSE INTERFERENCE IN PULSE MULTIPLEX TRANSMISSION

William R. Bennett and Carl B. H. Feldman, Summit, N. J., assignors to Bell Telephone Laboratories, Incorporated, New York, N. Y., a corporation of New York Application May 1, 1951, Serial No. 223,852

5 Claims. (Cl. 179—15)

This invention relates to pulse transmission and particularly to the multiplexing of pulse trains by time division techniques.

The general object of the invention is to increase the information-carrying capacity of a pulse transmission system.

If there were available a transmission medium of infinite band width, it would theoretically be possible to transmit a sequence of pulses over this medium with an infinite pulse repetition rate. With a finite band width extending from zero frequency as a lower bound to a frequency $f$ as its upper bound, it is possible to transmit pulses at the rate $2f$ pulses per second; in other words, the ratio of the greatest possible pulse repetition rate to the band width is 2. This general relation holds whether the pass band of the medium be ideal in the sense that its transmission is unity throughout the band and zero throughout the remainder of the frequency range or whether it departs from this ideal by a characteristic which slopes off in any one of a number of ways from the value of unity at zero frequency to the value of zero at some higher frequency provided that the pass band is defined as extending to the frequency $f$ at which the transmission is one half its maximum value and provided, further, that the sloping upper bound of the pass band is symmetrical about its mid-point.

When it is sought to transmit a sharp pulse through any medium having such a finite pass band, the effect of the medium is to modify the shape of the resulting pulse by spreading it out in time, and the exact shape of the resulting pulse on the time scale depends on the transmission characteristic of the medium. But the relation that a band width extending from zero to a frequency $f$ defined as above can transmit pulses at a rate of $2f$ pulses per second holds in all such cases independently of the exact character of the modification of the pulse. This is easily seen in the particular case of the ideal filter whose effect is to convert a sharp impulse into a so-called $$\frac{\sin x}{x}$$

pulse, which is characterized by a central peak with damped oscillations on both sides of it, each half cycle of the oscillations being separated from each other one by a zero value, these zero values being in turn spaced apart at equal intervals known as "Nyquist" intervals, the length of a Nyquist interval being, in time measure, $$\frac{1}{2f}$$

It is thus possible to locate another pulse at the first zero of the original pulse, a third pulse at its second zero, and so on, without interpulse interference; and the several pulses of the resulting train may be identified and disentangled at a receiver station by the technique of sampling the train at precisely those instants, one Nyquist interval apart, at which the desired pulse may be present but at which all of its neighbors are passing through their zero values. The same holds in a general way when the pass band of the medium departs from the ideal in the manner described above because, whatever the degradation of the pulse in passing through the medium, its magnitude is zero or negligible at instants which are spaced by Nyquist intervals from the instant at which it has its maximum value.

As a practical matter, many transmission media, such as circuits containing transformers, possess a lower bound higher than zero frequency; and for this reason, it is common to transmit a train of pulses by carrier techniques. When a pulse is modulated onto a high frequency carrier, it becomes the envelope of the carrier oscillations, and the required pass band is effectively moved upward in the frequency scale by an amount equal to the carrier frequency. This displaced pass band accommodates the upper side band of modulation frequencies. At the same time there must be provided another pass band of equal width for the lower side band frequencies. As a result, the entire pass band required for such transmission is twice as wide as the low frequency pass band required for transmission of the pulse alone; in other words, the ratio of the greatest possible pulse repetition rate to the band width has become 1 instead of 2.

In principle, it is possible to reduce this wide band requirement by employing single side band modulation techniques. As a practical matter, however, these techniques present difficulties which are serious in carrier transmission generally and some of which are practically fatal in the carrier transmission of pulses.

The present invention is based on the discovery that by the employment of a particular numerical relation which holds between the frequency of the pulse repetition rate and the frequency of the carrier onto which it is modulated, and by the employment, further, of particular phase relations between this carrier and the signal envelope, a damped oscillation of a particular form is generated, in which it is possible to find an instant within each pulse envelope at which the pulse carrier regularly passes through zero and that, by virtue of this recurrent zero within the pulse envelope, it is possible so to locate another pulse of similar wave form on the time scale that its peak coincides with the zero of the first pulse. This second pulse may be a pulse of a different train comprising a carrier wave onto which is modulated a signal pulse just as in the case of the first pulse, provided its peak is arranged to occur at the zero of the first pulse. In effect, two pulse trains are provided which are of like frequency and in time quadrature, and the pulses of each such train are modulated onto carriers which are again of like frequency and in time quadrature. The two resulting pulse trains may then be intermingled to form a composite train whose two components may be disentangled one from the other at a receiver station for demodulation. The disentangling operation may be carried out with sampling circuits or with coincidence gates which are appropriately timed at the basic pulse repetition rate and phased to suit the individual pulse trains. The composite wave train may be regenerated at a repeater station without the necessity of separating the individual pulse trains one from the other.

The system permits the employment of a simple and reliable modulator in the form of a network having certain transmission and phase characteristics. This network, when shock-excited by the interleaved sharp pulses of the composite pulse train, gives rise, for each pulse, to a damped oscillation having the required characteristics both in frequency and in phase.

The conditions which the shaping network should, ideally, satisfy are as follows:

(*a*) Its pass band is centered at a frequency which is an integral multiple of the basic pulse repetition rate and preferably equal to it;

(*b*) Its transmission curve is symmetrically disposed about this central frequency;

(*c*) The lower frequency branch of the curve is of zero amplitude at zero frequency, one-half amplitude at half the basic pulse repetition rate and unity amplitude at the basic pulse repetition rate, and is symmetrical about its mid-point;

(*d*) The upper frequency branch of the curve is of amplitude unity at the basic pulse repetition rate, zero at twice this rate and one-half at the frequency three halves this rate, and is symmetrical about its mid-point;

(*e*) The phase characteristic is linear with frequency throughout the major part of the transmission band, and its intercept on the vertical axis at zero frequency, if extended that far, represents a phase shift of an integral multiple of $\pi$ radians.

Minor departures from the exact characteristics described above produce correspondingly minor deviations in the performance of the apparatus.

The invention will be fully apprehended by reference to the following detailed description of preferred embodiments thereof, taken in connection with the appended drawings, in which:

Figs. 1, 3, and 5 are illustrative transmission versus frequency characteristics of various systems;

Figs. 2A, 2B, 4, and 6 show the wave forms which result when sharp impulses are applied to the systems of Figs. 1, 3, and 5, respectively;

Figure 1:
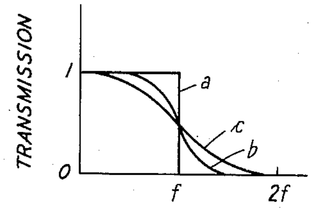
Figure 2A:
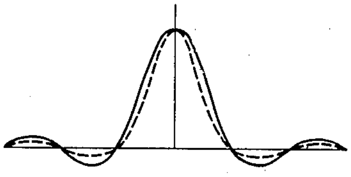
Figure 2B:
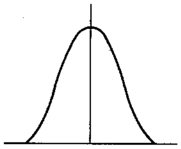

Referring now to the drawings, Fig. 1 shows the transmission versus frequency characteristics of several so-called low pass filters whose pass bands extend in each case from zero to the frequency $f$. The characteristic $a$ is the ideal sharp cut-off characteristic. The characteristics $b$ and $c$ depart therefrom by having more gradual slopes at the upper end of the band which is defined by the mid-point of these sloping parts which in turn are symmetrical about their mid-points. When a sharp impulse is transmitted through a system having any of these characteristics, it is more or less spread out. In the case of the ideal characteristic $a$, it is converted into a $$\frac{\sin x}{x}$$

pulse whose wave form is shown by the solid curve of Fig. 2A. The characteristic $b$ gives rise, similarly, to the wave shown in Fig. 2A by the broken line. The transmission characteristic defined by the curve $c$ reaches zero at the frequency $2f$ and follows a smooth course between the frequencies zero and $2f$. The effect of a medium having this characteristic on the sharp impulse is to spread it out approximately as indicated in Fig. 2B into a wave which resembles a single cycle of a sine wave. In what follows, this sine wave pulse will be employed as an example, though the invention is equally applicable to pulse envelopes of other forms, such as those of Fig. 2A.

Figure 3:
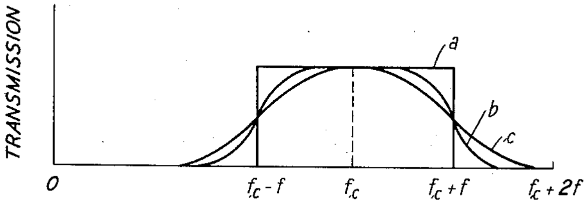
Figure 4:
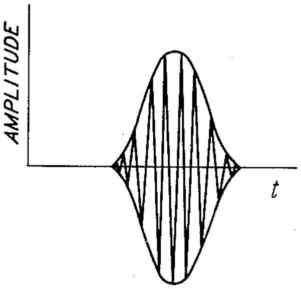

When it is desired to transmit the pulse of Fig. 2B by carrier techniques, it is modulated onto a high frequency carrier and forms the envelope of the resulting carrier oscillations as indicated in Fig. 4. Transmission of this modulated wave on a double side band basis requires that the transmission medium have a characteristic as indicated by the curve $c$ in Fig. 3. The upper half of this characteristic, starting at the carrier frequency $f_c$, is identical in shape with the characteristic of Fig. 1 and extends from the carrier frequency $f_c$ to one-half amplitude at the frequency $f_c+f$ and to zero at the frequency $f_c+2f$. Its lower half, measured downward in the frequency scale from the carrier frequency $f_c$, is the mirror image of the upper half and extends from the carrier frequency $f_c$ to one-half amplitude at the frequency $f_c-f$ and to zero at the frequency $f_c-2f$.

Figure 5:
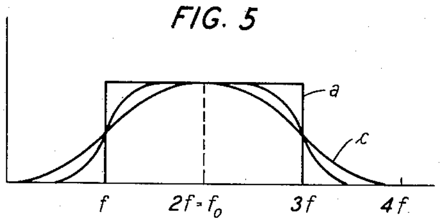

In accordance with the invention, the pass bands of Fig. 3 are displaced downward in the frequency scale as indicated in Fig. 5. In each case, the low frequency nominal cut-off is at the frequency $f$, and the high frequency nominal cut-off is at the frequency $3f$. The displacement is such that, in the case of the curve $c$, the freqency $fc-2f$ of Fig. 3 coincides with the origin, so that the transmission is zero at frequencies of zero and of $4f$, reaching half value at frequencies of $f$ and $3f$ and full value at the center of the band, namely, the frequency $2f$. As in the case of Fig. 3, the center of the band may be identified with the carrier frequency. As explained above, the medium having a pass band of this character can transmit successive pulses of conventional form at the rate of $2f$ pulses per second so that, when the matter is regarded in this light, the train of pulses is modulated onto a carrier whose frequency is equal to the pulse repetition rate of the train.

Figure 6:
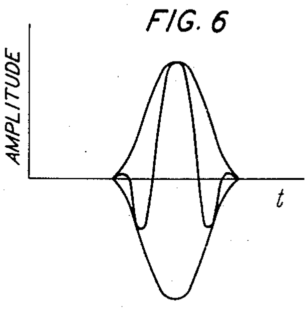

When the system having the characteristic of curve $c$ of Fig. 5 is shock-excited by a sharp impulse, the resulting wave has the form shown in Fig. 6, which is the same as Fig. 4 except for the much lower frequency of the carrier.

Figure 7A:
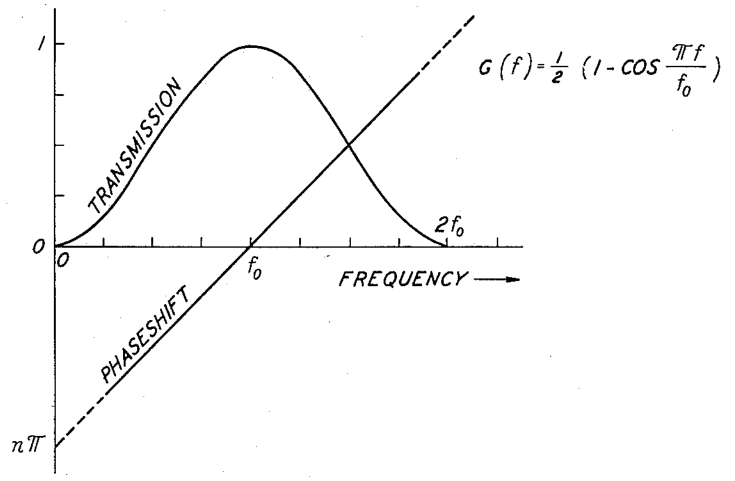
Fig. 7A shows the transmission and phase characteristics of a shaping network in accordance with the invention.

There are an infinitude of mathematically different curves which closely satisfy the above requirements on the transmission characteristic. One of these, employed by way of example, is a single full cycle of a cosine wave, displaced vertically until its minimum points touch the axis. This curve is shown in Fig. 7A. Its mathematical expression is $$G(f)=\frac{1}{2}\left(1-\cos\frac{\pi f}{f_0}\right),\ 0<f<2f_0 \qquad (1)$$

Figure 7B:
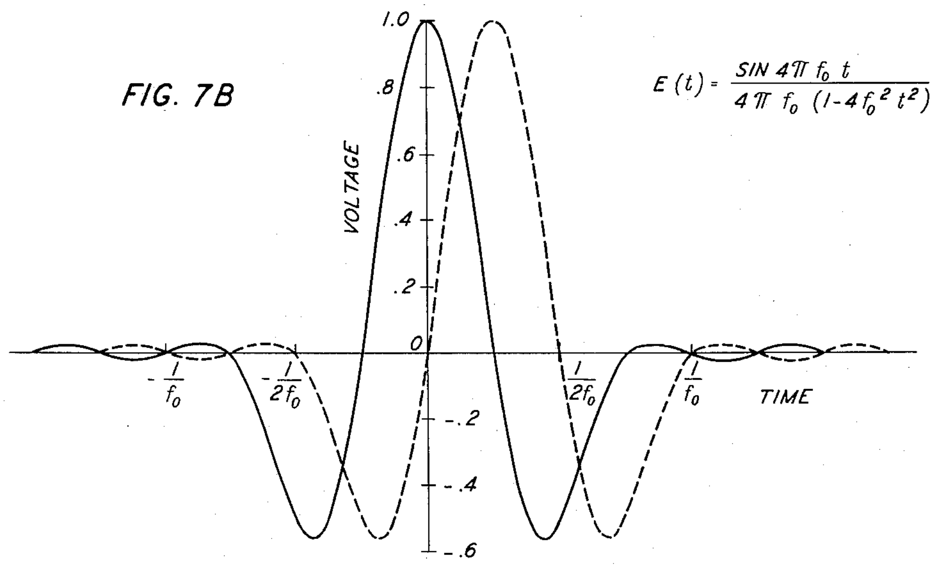
Fig. 7B is a wave form diagram of two adjacent pulses modulated in accordance with the invention and spaced one-quarter period apart.

Whena network having this characteristic and having, in addition, a phase characteristic which is linear throughout the major part of the pass band and whose intercept with the vertical axis is an integral multiple of $\pi$ radians, is shock-excited by a sharp impulse, it responds with the oscillation whose wave form is shown by the solid curve of Fig. 7B. This wave consists of a major central peak and subsidiary lobes of alternately opposite signs which diminish rapidly in amplitude with departure from the center from its resemblance to the outline of a sombrero, this wave has been designated a "Hat Pulse." It is particularly to be noted, that unlike the $$\frac{\sin x}{x}$$

curve of Fig. 2A, it has four central nulls which are equally spaced apart on the time scale. In other words, it is an oscillation which builds up to its central maximum and then dies down, the envelope having the wave form of the signal of Fig. 2B. The first null of the wave occurs just one-quarter cycle after its major positive peak. The amplitude of this wave is mathematicallly represented by the expression $$E(t)=\frac{\sin 4\pi f_0 t}{4\pi f_0 t(1-4f_0^2 t^2)} \qquad (2)$$

The broken line of Fig. 7B shows another wave identical in form and displaced from the first by one-quarter cycle so that its major positive peak coincides in time with the first null of the first pulse. Evidently, if pulses having these wave forms were to be transmitted together over a common medium and if, at a receiver station, a sampling process were to be applied to the composite pulse train at precisely those instants at which the two larger peaks were due to occur, the result of the first sampling operation would be to derive a signal related only to the magnitude of the first pulse, while the result of the second sampling operation would be to derive a signal related only to the magnitude of the second pulse. This is in effect the process carried out by the apparatus of the invention.

Figure 8:
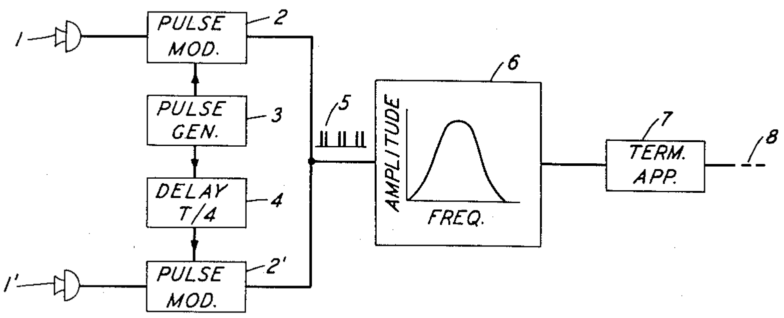
Fig. 8 is a schematic block diagram showing transmitter apparatus in accordance with the invention.

In a simple illustrative form, this apparatus may comprise a duplex pulse modulation telephone system of which the essentials of the transmitter apparatus are shown in Fig. 8. Here, voice signals picked up by two telephone instruments 1, 1' pass to two pulse modulators 2, 2', each of which converts the voice signals into a sequence of pulses which recur at regular intervals, the two sequences being of the same basic pulse repetition rate $f_0$ and displaced in time from each other one quarter of the pulse period. To this end, the control of the timing may be derived from a pulse generator 3 which feeds directly into one of the modulators and, by way of a time delay device 4 which introduces a delay of one-quarter period, to the other modulator. The delay device 4 may be of any suitable variety, for example, a terminated electromagnetic transmission line. The pulse generator 3 should be such as to deliver impulses of the briefest possible duration and with great regularity. Apparatus having this property is well known, a common example being a multivibrator which delivers rectangular pulses followed by a differentiating circuit which delivers a sharp positive impulse at the leading edge of each rectangular pulse and a sharp negative impulse at its trailing edge, followed in turn by a rectifier which removes the negative pulses.

The pulse modulators 2, 2' may likewise be of any desired variety provided their outputs are unmodulated in duration or in the instants at which they occur. In other words, they may deliver pulses which are amplitude-modulated or code-modulated. In view of the high performance of code modulation systems, the use of pulse code modulators is preferred and, among others, apparatus for converting voice signals into sequences of code groups of pulses of equal amplitudes recurring with great regularity, is described in two articles published in the Bell System Technical Journal for January 1948, vol. 27, pages 1 and 44.

The two trains of sharp pulses which constitute the outputs of the pulse modulators are then combined on the basis of simple addition at the point. The resulting composite train 5 is then applied to a shaping network 6 whose transmission characteristic is that of Fig. 7A, and which therefore converts each of the sharp pulses supplied to it into one of the pulses depicted in Fig. 7B. Because the applied sharp pulses of the train 5 arrive in pairs, the second member of each pair following the first by one-quarter pulse period, the output due to the first pulse of each pair may be regarded as being depicted by the solid line of Fig. 7B, while the output due to the second pulse of the pair is depicted by the broken line of Fig. 7B.

Figure 9:
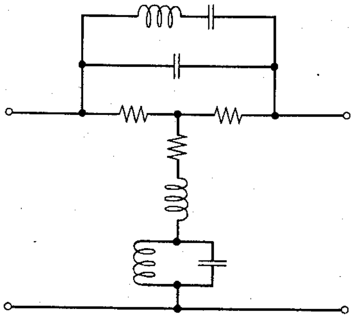
Fig. 9 is a schematic circuit diagram showing the configuration of one section of a network having the characteristics of Fig. 7A.

The characteristics of Fig. 7A may be secured with various structures, one such structure being a three-section filter of which each section has the configuration shown in Fig. 9. It is merely a matter of design, following the well-known techniques of network synthesis to select the magnitudes of the various elements of Fig. 9 so that the characteristics of Fig. 7A shall result.

A wave form closely approximating that shown in Fig. 7B may be generated in other ways. For example because, as is well known, the Gaussian or Error function is the Fourier transform of itself, the shock-excitation, by a sharp impulse, of a network whose transmission characteristic is a Gaussian function of frequency, gives rise to a response which is a Gaussian function of time. The configuration of the Gaussian curve is well known and filters whose transmission characteristics have the form of Gaussian curves are described in articles published by C. B. Feldman and W. R. Bennett in the Bell System Technical Journal for July, 1949, volume 28, page 490, and by F. F. Roberts and J. C. Simonds in the Philosophical Magazine for November, 1944, volume 35, page 778. The transmission of such a band-pass filter is given, as a function of the frequency $f$, by the formula $$G(f)=A\epsilon^{-\left(\frac{f-f_m}{\Delta}\right)^2} \quad (3)$$

where $f_m$ is the midband frequency and $\Delta$ is the difference between the midband frequency $f_m$ and the frequency at which the transmission is reduced to a fraction $1/\epsilon$ of its transmission at the midband frequency.

When such a curve is centered at zero frequency, $f_m=0$ and the formula for the resulting low-pass filter reduces to $$G_1(f)=A\epsilon^{-\left(\frac{f}{\Delta}\right)^2} \quad (4)$$

$\Delta$ is now the frequency at which the transmission is reduced to a fraction $1/\epsilon$ of its value at zero frequency. The curve C of Fig. 1 closely approximates the curve of this formula (4). As explained above, application of a pulse to a filter whose transmission is given by the curve C of Fig. 1, i. e., one whose shape is near-Gaussian in the frequency domain, gives rise to a pulse having the shape of Fig. 2B, namely one which is near-Gaussian in the time-domain.

Figure 10:
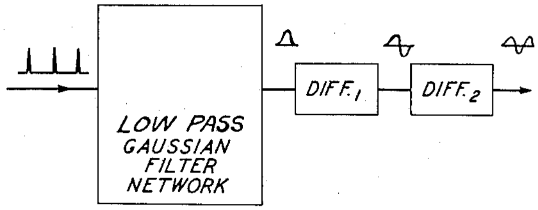
Fig. 10 is a schematic block diagram showing an alternative structure for generating the wave of Fig. 7B.

It is easily seen that two successive differentiation operations applied to such a Gaussian or near-Gaussian pulse result in a pulse having two equal positive peaks with a larger negative peak between them and that the spacings among the central four nulls are almost exactly alike. Thus, with the apparatus illustrated in Fig. 10 comprising a low-pass Gaussian network followed in succession by two differentiating networks which successively modify the wave shape as indicated in the figure, it is possible to apply a sequence of sharp pulses as shocks to the input terminals and to derive from the output terminals a wave which is closely equal to the wave of Fig. 7B. The fact that this output wave is inverted in polarity with respect to the wave of Fig. 7B is of no practical consequence.

After the pulse sequence has been shaped in the manner described above, it may be applied to terminal apparatus 7 of any desired variety and transmitted over an outgoing path 8 to a receiver station.

The essentials of the receiver station are that the incoming composite pulse train, which arrives by way of an incoming line 10, shall be sampled at just those brief instants at which one or the other of the pulses of Fig. 7B is passing through its null value. Thus, two samplers 11, 11' are provided, the composite pulse train being fed to them in parallel, timing pulses being furnished to the samplers which are displaced in time, one from the other, by one-quarter period. The timing pulses may be derived from the composite incoming train in conventional fashion as by passing the train through a narrow band pass filter 12 tuned to the basic pulse repetition rate to derive a substantially continuous oscillation at the frequency of the basic pulse repetition rate. The pulse train is rich in spectral components of this frequency. This continuous wave is adjusted in phase by a phase shifter 13, which merely balances the effects of miscellaneous phase shifts and delays elsewhere in the system, and applied as the timing control of a pulse generator 14, which may be similar to the pulse generator 3 at the transmitter station, and delivers a sequence of sharp pulses at the basic pulse repetition rate. The output of the generator divides into two paths, one of which supplies timing pulses to one of the samplers 11, while the pulses applied to the second sampler 11′ are first delayed by one-quarter period by the action of the delay device 15, which, as in the case of the pulse delay device 4 of Fig. 8, may be of ordinary construction. The samplers 11, 11′ themselves may be simple coincidence gates which deliver outputs only when two inputs occur in time coincidence, the output being in each case proportional to the magnitude of one of the inputs. In the pulse code modulation system taken for illustration in which the nominal magnitude of each pulse may have only one or other of two values, namely, "on" or "off," the inclusion of a slicing operation is advantageous. A suitable slicer is shown in the aforementioned Bell System Technical Journal publication, and, in combination with a sampler, it is shown in L. A. Meacham Patent 2,537,843.

By virtue of the fact that the composite incoming train is sampled by each of the samplers 11, 11′ at the proper instant, the output of the upper sampler 11 represents the original undelayed pulse train, derived from the first telephone instrument 1, while the output of the lower sampler 11′ represents the original delayed pulse train derived from the second telephone instrument 1′. The two pulse trains have thus been sorted one from the other, and each may now be restored to the form of a voice signal by a pulse demodulator 16 or 16′ of appropriate variety for delivery to a reproducer 17 or 17′.

Figure 11:
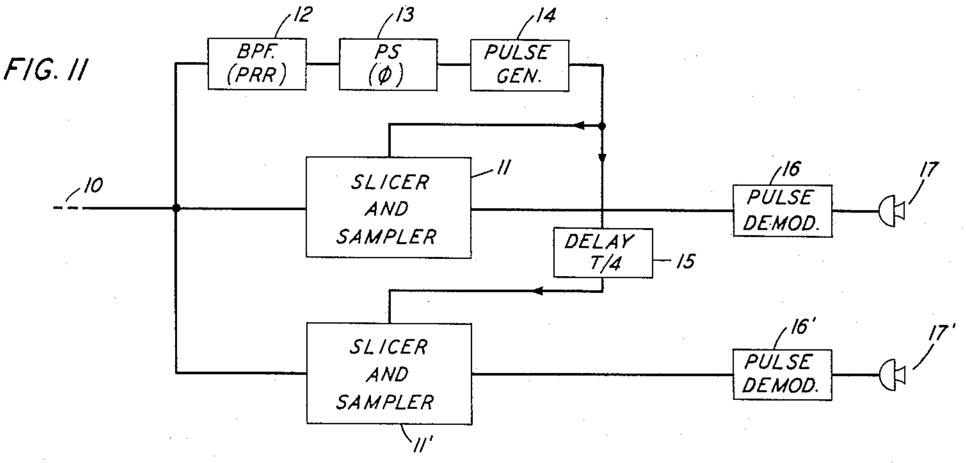
Fig. 11 is a schematic block diagram showing receiver apparatus in accordance with the invention.
Figure 12:
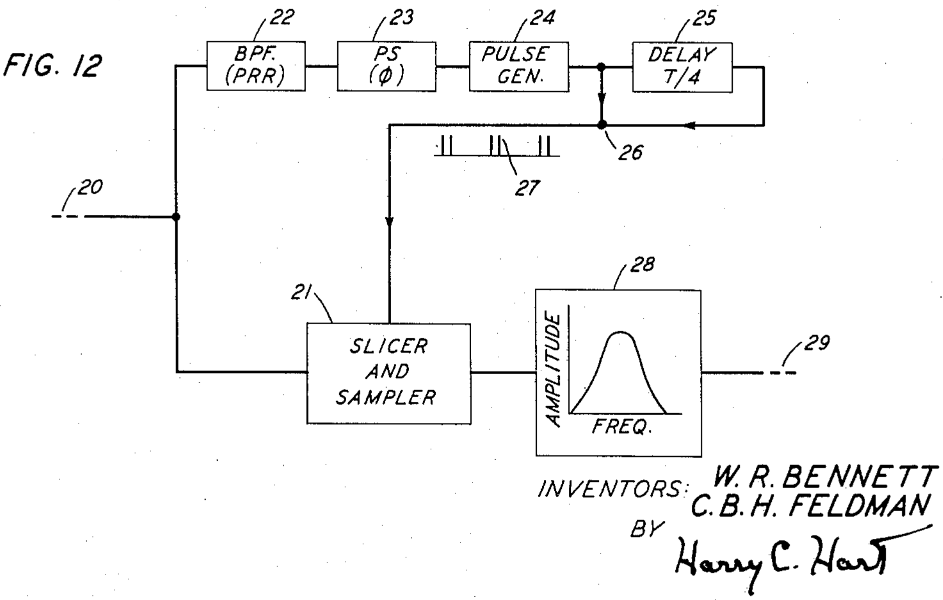
Fig. 12 is a schematic block diagram showing regenerative pulse repeater apparatus in accordance with the invention.

The composite pulse train of the invention may, if desired, be regenerated at a repeater station located between the transmitter station and the receiver station, and this without separating the two original pulse trains one from the other. Fig. 12 is a schematic block diagram showing regenerator apparatus. Here, the incoming pulse train, which arrives over the line 20, is applied to a sampler 21 which may be identical with either of the samplers of Fig. 11 but which now is timed to take successive samples at instants which are separated in time by one quarter of the pulse period and then to pause for three quarters of a pulse period before taking the next sample. To this end, a sequence of timing pulses is derived by the combination of a narrow band pass filter 22 tuned to the basic pulse repetition rate, a phase shifter 23, and a pulse generator 24, as in the case of Fig. 11. The output of the pulse generator, which now consists of a sequence of sharp pulses recurring regularly at the basic pulse repetition rate, is passed through a quarter-period delay device 25, and the pulse sequence thus delayed by one-quarter period is then combined at the point 26 with the undelayed pulse sequence to form a sequence of pulse pairs 27. These are applied as timing pulses to the sampler 21 whose output thus likewise consists of a sequence of pulse pairs, differing only from the arrangement of the timing pulse pairs in that certain of the pulses of the sequence are missing from time to time in the case of pulse-code transmission, or are of various amplitudes in the case of pulse-amplitude transmission. This composite pulse train is now applied to a shaping network 28 which may be identical with the shaping network 6 of Fig. 8 and whose output is now in the form of a sequence of pulses of the wave forms shown in Fig. 7B and ready for retransmission over the outgoing line 29.

While the invention has been described with reference to its application to a duplex telephone system, thus permitting the transmission of messages originating with two speakers over the transmission channel which, without the invention, would be capable of carrying the voice of only one of them, it is equally applicable to the improvement of the quality of the transmission of the voice of a single speaker by arranging that samples of his voice taken at regular intervals shall modulate the two pulses of a time quadrature pair. In view of the well-known exchange relation which holds between band width and quality, the invention may also be applied, either for a single talker or for two, to the reduction of transmission band width with retention of present quality without improvement.

What is claimed is:

1. In the art of multiplex pulse transmission of signals, the combination which comprises means for generating a first train of pulses at a basic pulse repetition rate $f_0$, means for generating a second train of pulses at the same pulse repetition rate and in time quadrature with the first train, means for modulating the pulses of the first train with signals of a first group, means for modulating the pulses of the second train with signals of a second group, and means comprising a filter for shaping each pulse of each of said trains to the form of a damped oscillation characterized by four equally spaced nulls and a major peak included between the second null and the third, said third null being spaced from said major peak by one quarter of the basic pulse period, whereby interpulse interference between said trains, when they are transmitted together, is substantially eliminated.

2. Apparatus as defined in claim 1 wherein said pulse-shaping means comprises a network having a substantially Gaussian transmission-frequency characteristic, a first differentiator connected to said network and a second differentiator connected to said first differentiator, said Gaussian characteristic being one whose transmission $G(f)$ is given, as a function of the frequency $f$, substantially by the formula $$G(f)=A\epsilon^{-\left(\frac{f}{\Delta}\right)^2}$$

wherein $\Delta$ is the frequency at which the transmission $G(f)$ is reduced to a fraction $1/\epsilon$ of its value at zero frequency, and A is a constant.

3. In the art of multiplex pulse transmission of signals, the combination which comprises means for generating a first train of pulses at a basic pulse repetition rate $f_0$, means for generating a second train of pulses at the same pulse repetition rate and in time quadrature with the first train, means for modulating the pulses of the first train with signals of a first group, means for modulating the pulses of the second train with signals of a second group, a frequency-selective network having a pass band centered at the frequency $f_0$, having a transmission factor of 1/2 for frequencies of $\frac{1}{2} f_0$ and $\frac{3}{2} f_0$, having a transmission factor of zero for frequencies of zero and $2f_0$, having rising and falling branches which are symmetrical about their midpoints, and having a phase shift characteristic which is linear with frequency throughout the major part of said pass band and whose extension to zero frequency represents a phase shift of $n\pi$ radians, and means for passing each of said pulse trains through said network, whereby interference between said trains is substantially eliminated, and means for transmitting said pulse trains over a common medium to a receiver station.

4. In the art of multiplex pulse transmission of signals, the combination which comprises means for generating a first train of pulses at a basic pulse repetition rate $f_0$, means for generating a second train of pulses at the same pulse repetition rate and in time quadrature with the first train, means for modulating the pulses of the first train with signals of a first group, means for modulating the pulses of the second train with signals of a second group, a frequency-selective network whose transmission $G(f)$ is given, as a function of the frequency $f$, substantially by the formula $$G(f)=\frac{1}{2}\left(1-\cos\frac{\pi f}{f_0}\right),\ 0<f<2f_0$$

and means for passing each of said pulse trains through said network, whereby interference between said trains is substantially eliminated, and means for transmitting said pulse trains over a common medium to a receiver station.

5. In the art of multiplex pulse transmission of signals, the combination which comprises means for generating a first train of pulses at a basic pulse repetition rate $f_0$, means for generating a second train of pulses at the same pulse repetition rate and in time quadrature with the first train, means for modulating the pulses of the first train with signals of a first group, means for modulating the pulses of the second train with signals of a second group, and means for converting each pulse of each of said trains into a wave $E(t)$ having a form given, as a function of the time $t$, substantially by the formula $$E(t)=\frac{\sin 4\pi f_0 t}{4\pi f_0 t(1-4f_0^2t^2)}$$

whereby interpulse interference between said trains, when they are transmitted together, is substantially eliminated.

References Cited in the file of this patent

UNITED STATES PATENTS

| | | |
|---|---|---|
| 2,418,116 | Greig | Apr. 1, 1947 |
| 2,438,908 | Goodall | Apr. 6, 1948 |
| 2,548,796 | Houghton | Apr. 10, 1951 |
| 2,587,741 | Libois | Mar. 4, 1952 |